United States Patent
Akenine-Moller et al.

(10) Patent No.: US 10,466,769 B2
(45) Date of Patent: *Nov. 5, 2019

(54) REDUCING POWER CONSUMPTION DURING GRAPHICS RENDERING

(71) Applicant: Intel Corporation, Santa Clara, CA (US)

(72) Inventors: Tomas G. Akenine-Moller, Lund (SE); Bjorn Johnsson, Eslov (SE); Magnus Andersson, Helsingborg (SE); Jim K. Nilsson, Lund (SE); Robert M. Toth, Lund (SE); Carl J. Munkberg, Malmo (SE); Jon N. Hasselgren, Bunkeflostrand (SE)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/929,833

(22) Filed: Nov. 2, 2015

(65) Prior Publication Data

US 2016/0054790 A1 Feb. 25, 2016

Related U.S. Application Data

(63) Continuation of application No. 13/784,950, filed on Mar. 5, 2013, now Pat. No. 9,201,487.

(51) Int. Cl.
*G06F 1/32* (2019.01)
*G06F 1/3296* (2019.01)
(Continued)

(52) U.S. Cl.
CPC ............ *G06F 1/3296* (2013.01); *G06F 1/324* (2013.01); *G06F 1/329* (2013.01); *G06F 1/3228* (2013.01);
(Continued)

(58) Field of Classification Search
CPC ................................ G06F 1/3234; G06F 1/324
(Continued)

(56) References Cited

U.S. PATENT DOCUMENTS 6,424,320 B1 * 7/2002 Callway ................ G06F 3/1438
345/1.1
7,426,320 B2 * 9/2008 Stevens ...................... G06F 1/32
375/E7.141
(Continued)

FOREIGN PATENT DOCUMENTS

JP 2011113454 A 6/2011

OTHER PUBLICATIONS

EP Extended search report for corresponding EP application EP14157830 dated Sep. 3, 2014 (5 pages).
(Continued)

*Primary Examiner* — Volvick Derose
(74) *Attorney, Agent, or Firm* — Trop, Pruner & Hu, P.C.

(57) ABSTRACT

In accordance with some embodiments, the knowledge that a capped frame time is used can be exploited to reduce power consumption. Generally a capped frame time is a pre-allocated amount of time to apply power for rendering in graphics processing. Generally the frame time involves the application of power and some down time in which only idle power is applied pending the next frame time. By making better use of that down time, power consumption reductions can be achieved in some embodiments.

18 Claims, 4 Drawing Sheets

(51) Int. Cl.
  *G06F 1/3234* (2019.01)
  *G06F 1/324* (2019.01)
  *G06F 1/329* (2019.01)
  *G06F 1/3228* (2019.01)
  *G06F 1/3203* (2019.01)
  *G06F 1/3215* (2019.01)
  *G06F 1/3209* (2019.01)

(52) U.S. Cl.
  CPC .......... *G06F 1/3234* (2013.01); *G06F 1/3203* (2013.01); *G06F 1/3209* (2013.01); *G06F 1/3215* (2013.01); *Y02D 10/126* (2018.01); *Y02D 10/24* (2018.01)

(58) Field of Classification Search
  USPC ........................................................ 713/323
  See application file for complete search history.

(56) References Cited

U.S. PATENT DOCUMENTS

| | | | |
|---|---|---|---|
| 7,456,833 B1* | 11/2008 | Diard | G06T 1/20 345/440 |
| 7,721,118 B1* | 5/2010 | Tamasi | G06F 1/3203 345/502 |
| 7,796,692 B1* | 9/2010 | Falardeau | H04N 19/159 375/240.12 |
| 7,903,116 B1* | 3/2011 | Klock | G06F 1/3203 345/501 |
| 7,996,688 B2 | 8/2011 | Little | |
| 8,102,398 B2* | 1/2012 | Bajic | G06F 1/3225 345/503 |
| 8,199,158 B2 | 6/2012 | Samson et al. | |
| 8,325,248 B2 | 12/2012 | Yanowitz et al. | |
| 9,256,265 B2 | 2/2016 | Huang et al. | |
| 9,355,585 B2 | 5/2016 | Tripathi et al. | |
| 2003/0233592 A1* | 12/2003 | Lin | G06F 1/3228 713/320 |
| 2004/0039954 A1* | 2/2004 | White | G06F 1/3203 713/322 |
| 2005/0024365 A1* | 2/2005 | Ohba | G06F 1/3203 345/501 |
| 2005/0073616 A1* | 4/2005 | Joo | G09G 3/2029 348/797 |
| 2005/0124389 A1* | 6/2005 | Yang | H04B 1/1615 455/574 |
| 2006/0058652 A1* | 3/2006 | Little | G01S 15/899 600/437 |
| 2006/0227253 A1* | 10/2006 | Kim | G09G 3/2029 348/739 |
| 2007/0206018 A1* | 9/2007 | Bajic | G06F 1/3225 345/501 |
| 2007/0283175 A1* | 12/2007 | Marinkovic | G06F 1/3218 713/320 |
| 2008/0100636 A1* | 5/2008 | Lai | G09G 5/39 345/546 |
| 2009/0002387 A1* | 1/2009 | Woo | G06T 15/04 345/582 |
| 2009/0006875 A1* | 1/2009 | Varma | G06F 1/3203 713/320 |
| 2009/0079746 A1* | 3/2009 | Howard | G06F 1/3218 345/502 |
| 2009/0102850 A1* | 4/2009 | Liang | G09G 3/2059 345/545 |
| 2009/0309885 A1 | 12/2009 | Samson | |
| 2010/0020088 A1* | 1/2010 | Harumoto | B01J 31/04 345/522 |
| 2010/0060752 A1* | 3/2010 | Tokuyama | G07F 17/32 348/240.3 |
| 2010/0303289 A1* | 12/2010 | Polzin | G06K 9/00342 382/103 |
| 2011/0148887 A1* | 6/2011 | Chong | G06T 1/00 345/501 |
| 2011/0157191 A1* | 6/2011 | Huang | G06F 1/3203 345/503 |
| 2011/0298933 A1* | 12/2011 | Yanowitz | H04N 5/367 348/175 |
| 2012/0260081 A1* | 10/2012 | de Cesare | G06F 9/4893 713/100 |
| 2012/0293519 A1* | 11/2012 | Ribble | G06T 15/005 345/501 |
| 2013/0021352 A1* | 1/2013 | Wyatt | G09G 5/395 345/520 |
| 2013/0054998 A1* | 2/2013 | Wyatt | G06F 1/3265 713/323 |
| 2013/0179711 A1* | 7/2013 | Aelion | G06F 1/324 713/322 |
| 2013/0201168 A1* | 8/2013 | Lu | G06F 1/3228 345/207 |
| 2013/0257752 A1* | 10/2013 | Tripathi | G09G 3/20 345/173 |
| 2014/0002739 A1* | 1/2014 | Kwa | H04N 5/46 348/536 |
| 2014/0092109 A1* | 4/2014 | Saulters | G09G 5/363 345/522 |
| 2014/0094299 A1* | 4/2014 | Stine | A63F 13/00 463/31 |
| 2014/0160136 A1* | 6/2014 | Kaburlasos | G09G 5/00 345/520 |
| 2014/0189091 A1* | 7/2014 | Tamasi | H04L 43/0858 709/224 |
| 2014/0215253 A1* | 7/2014 | Klassen | G06F 1/3206 713/340 |
| 2014/0376553 A1* | 12/2014 | Arikawa | H04L 69/22 370/392 |

OTHER PUBLICATIONS

CN office action in corresponding CN application No. 201410145269.9 dated Mar. 3, 2016.
CN office action in corresponding CN application No. 201410145269.9 dated Oct. 28, 2016.
EP office action in corresponding EP application No. 14157830.2 dated Jan. 17, 2017.
JP office action in corresponding JP application No. 2014-041658 dated Jan. 27, 2015.
EP office action in corresponding EP application No. 14157830.2-1221 dated Apr. 4, 2019 (21 pages).

* cited by examiner

REDUCING POWER CONSUMPTION DURING GRAPHICS RENDERING

CROSS-REFERENCE TO RELATED APPLICATIONS

This is a non-provisional application based on non-provisional application Ser. No. 13/784,950 filed on Mar. 5, 2013, hereby expressly incorporated by reference herein.

BACKGROUND

This relates generally to graphics processing.

In the course of graphics processing, primitives may be rendered. Computer graphics uses algorithms that generate or render, from a scene or drawing, a raster image that can be depicted on a display device. Traditionally, a rasterization pipeline performs the steps to produce a digital image from geometric data and usually only uses direct lighting and sometimes also with shadows. It does not consider the advanced interplay (e.g., indirect illumination) of light between objects of the scene and is differentiated in this respect from approaches such as ray tracing and global illumination.

There are a number of devices that do graphics rendering for which power consumption is important. Particularly for the class of battery powered processor based devices, power consumption is always an important concern. But it is also an environmental concern in connection with all processing devices. In general it is desirable to reduce the power consumption of any device at least to the extent that it does not significantly affect the performance of that device.

BRIEF DESCRIPTION OF THE DRAWINGS

Some embodiments are described with respect to the following figures.

DETAILED DESCRIPTION

In accordance with some embodiments, the knowledge that a capped frame time is used can be exploited to reduce power consumption. Generally a capped frame time is a pre-allocated amount of time to render a frame in graphics processing. Generally the frame time involves the rendering process, where the device will run at high utilization and consume power, and some down time in which only idle power will be consumed, pending the next frame timeslot. By making better use of that down time, power consumption reductions can be achieved in some embodiments.

Figure 1A:
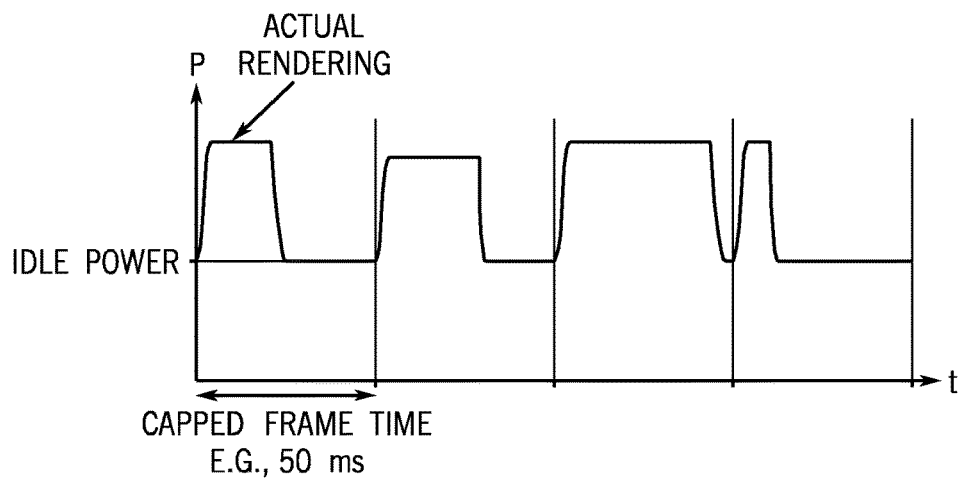
FIG. 1A-1D are depictions of a number of traces of power versus time in accordance with embodiments of the present invention.

Referring to FIG. 1A, in a hypothetical graph of power versus time, actual rendering occurs at each positive spike above idle power during the course of each of four depicted capped frame times. The number of frames is not limited in any way. The frame times tend to be longer than the time actually used for rendering. The frame rate may be capped to a constant in games and other applications. This means that the central processing unit and the graphics processing unit wait after an image has been rendered until it is time to render a new image. However, several images may be rendered in parallel for double and triple buffering.

Usually there is a power boost in the beginning of the capped frame time and then power consumption may become lower. During this period of lower power consumption, a central processing unit and a graphics processing unit are waiting for the next frame to be rendered. But these waiting processors are not at zero power consumption but rather consume idle power needed to keep the processors ready to do the next operation.

In this example, four frames of different peak power and different actual rendering time are depicted but each of the four frames includes the same capped frame time in this example, 50 milliseconds. Typically, the capping time is equal to, or a multiple of, the vertical sync (VSYNC) which often is 60 Hertz.

In accordance with some embodiments, a new application program interface (API) call may be used to reduce power consumption. For example, it may be an addition to conventional rendering protocols such as OpenGL, OpenGL ES, and DirectX APIs, as examples.

If the central and/or graphics processing units are made aware of this capped time frame duration, the idle time within each frame may be exploited via an API call. Then, since the processing unit knows when the rendering of a frame has been completed, it also knows the duration until the next frame begins. If this period of time is long enough, the central processing unit and graphics processing unit can be put into a deeper sleep mode in one embodiment shown by cross-hatching in FIG. 1B. In the deeper sleep mode, the power consumption is even lower than in the idle power mode. For example, in the Advanced Configuration and Power Interface (ACPI) specification, a processor can be reduced to the C3 power consumption state, as one example, from the C0 power consumption state. The cross-hatched area shows the power consumption reduction that results from the deeper power consumption state.

Figure 1B:
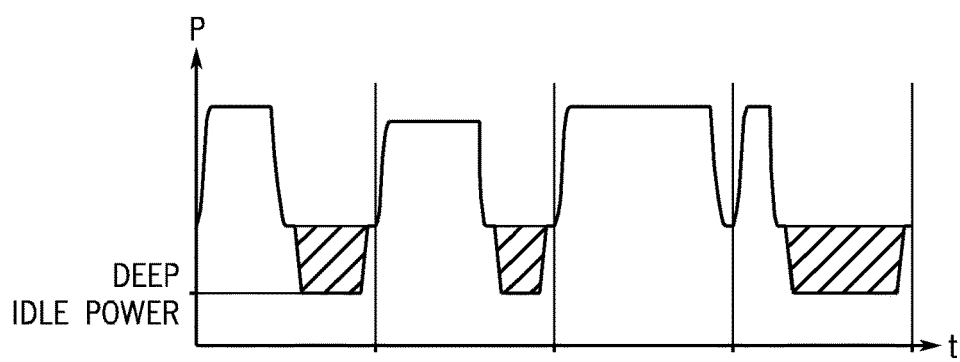

Thus in the case of FIG. 1B, each of the first, second and fourth frames can benefit from this technique while the third frame has too short of an idle state to make effective use of the reduction that could be achieved by transitioning to a deeper idle power state. This is because the idle to power time is so short it would just waste power to reduce the power consumption state and then quickly come back to a higher power consumption state.

Figure 1C:
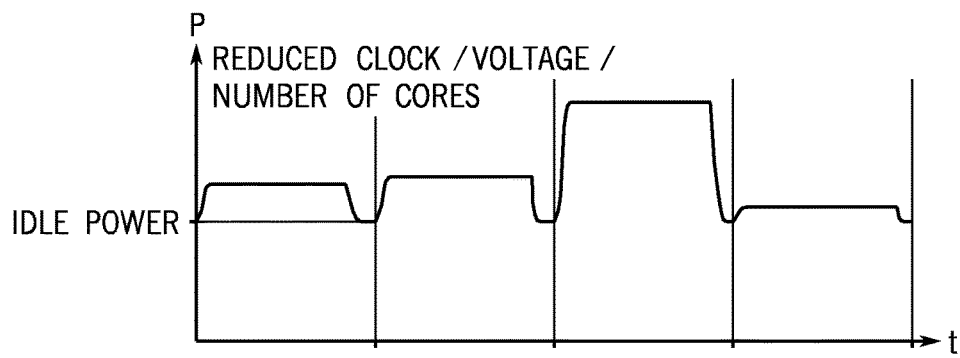

Still another embodiment, shown in FIG. 1C, exploits the knowledge of the capped frame time by letting the rendering work actually take longer. Since unused time exists between the actual rendering in one frame and the next, less power can be consumed during the actual rendering and still get the work done in plenty of time for the next cycle. The work could be done more slowly by using a lower clock frequency, and/or shutting down to a deeper sleep mode a number of the shader cores while keeping a sufficient number of cores sufficiently active. Again, prior knowledge of the expected frame rendering time is used to achieve this power saving.

Figure 1D:
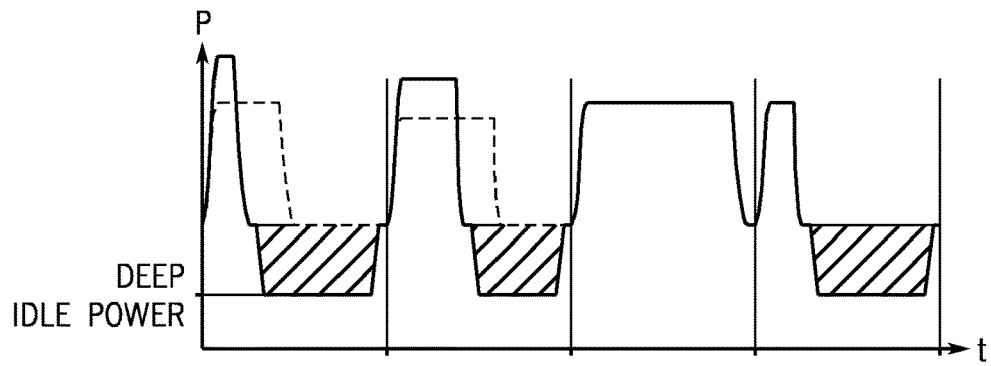

As still another example illustrated in FIG. 1D, the API provided capped frame time may be used to increase the power usage initially as shown for the first two frames in the beginning of rendering the frame in order to finish the work more quickly. This may be done by running the shader cores at a higher power consumption mode and/or increasing clock frequency. Depending on the battery technology used, this may be the most power efficiency method. This is elaborated on in the next paragraph.

Some battery powered devices may be more energy efficient when working for a short period of time at a higher power usage rate than when using less power because power usage is not linear compared to using lower power for a longer period of time. Thus by increasing the power consumption to reduce the actual rendering time and to increase the time in the deep idle power consumption state, power consumption savings can be achieved for certain battery technologies.

As still another embodiment, rendering the next frame can begin early if the necessary data is available and there is enough time to enter deeper sleep. This may extend the period of deeper sleep after the next frame. For example in FIG. 1D, the fourth frame may be commenced immediately after the third frame instead of waiting for the full two frame times to elapse since there is not enough time to enter the deeper sleep between these two frames.

Figure 2:
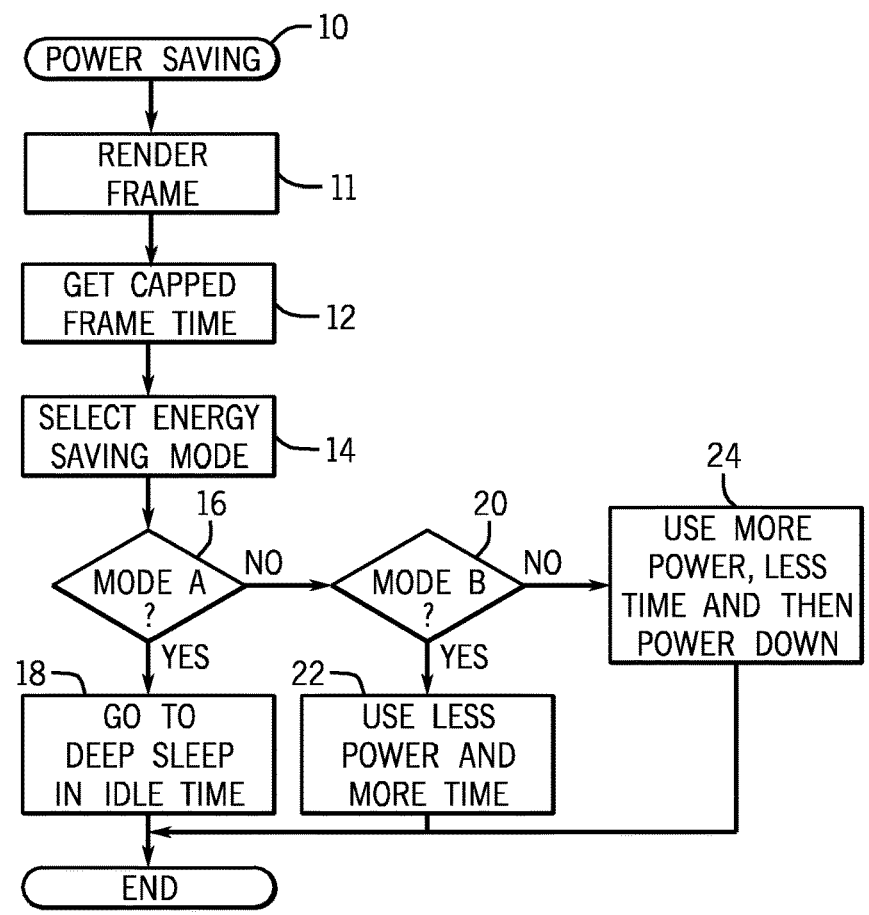
FIG. 2 is a flow chart for a sequence according to one embodiment.

The power savings sequence 10 shown in FIG. 2 may use one or more of the above-described embodiments. It may be implemented in software, firmware and/or hardware. In software and firmware embodiments it may be implemented by computer executed instructions stored in one or more non-transitory computer readable media such as magnetic, optical or semiconductor storages.

The sequence 10 begins by rendering the frame (block 11) and then accessing the capped frame time as indicated in block 12 in the central processing unit and/or a graphics processing unit. Then an energy saving mode may be selected as indicated in block 14. For example in one embodiment the different saving modes may be represented by the techniques illustrated in connections with FIGS. 1B, 1C, and 1D. If the mode A corresponding to FIG. 1B is selected as determined in diamond 16, then the processing can be put into a deeper sleep in the idle time as indicated in block 18. If the mode A is not selected as determined in diamond 16, a check at diamond 20 determines whether the mode B corresponding to FIG. 1C is selected. If so, less power is used over a longer time as indicated in block 22. Finally if neither mode A or mode B is selected, then it is presumed that mode C corresponding to FIG. 1D has been selected as indicated at block 24. In such case more power is used for less time and then more time could be spent in a deeper idle power state. If there is no idle time, then no power savings method should be selected.

Figure 3:
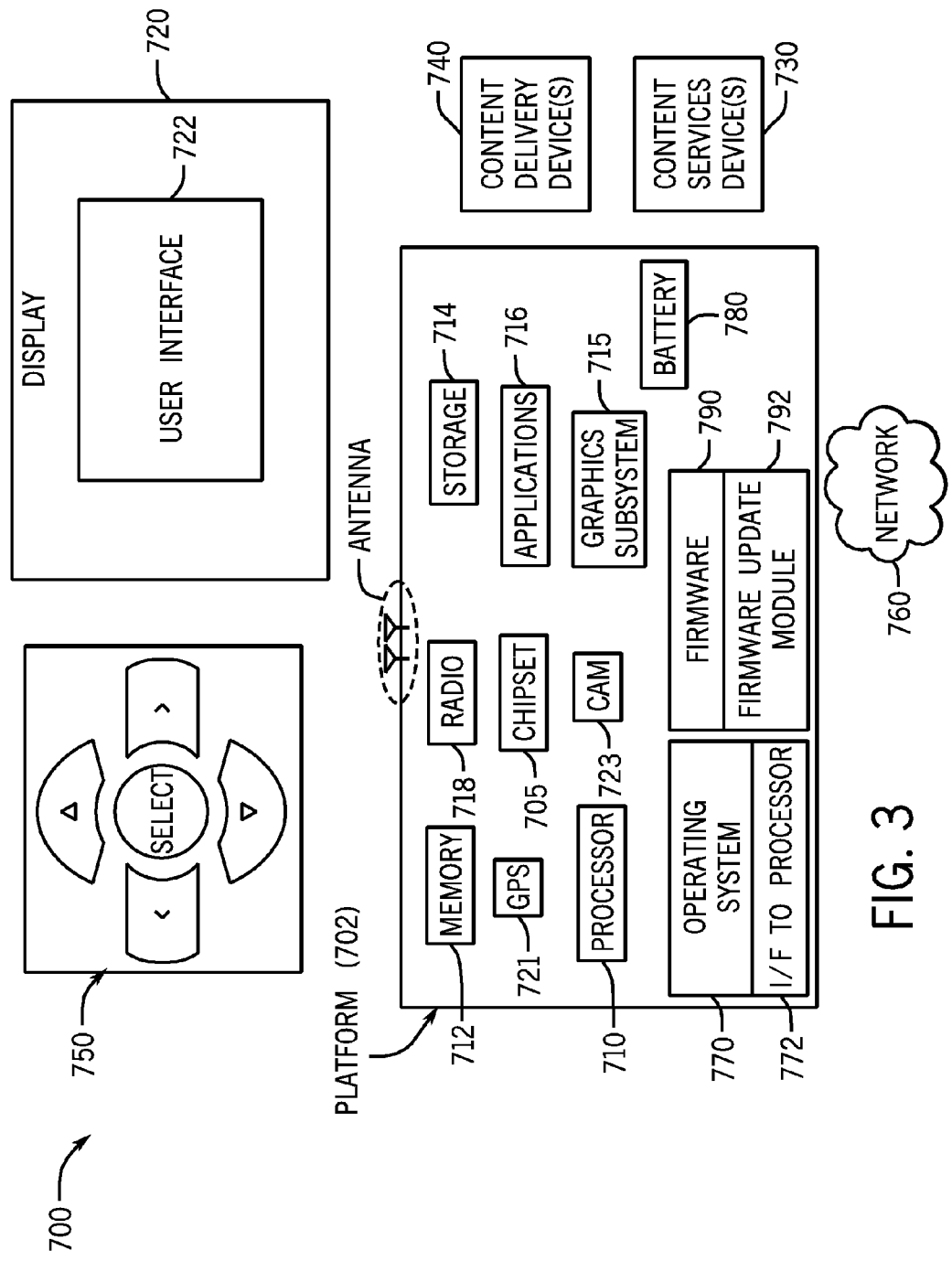
FIG. 3 is a system depiction for one embodiment.

FIG. 3 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth. The processor may implement the sequence of FIG. 2 together with memory 712.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit embodiments of the invention.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the invention.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 3.

Figure 4:
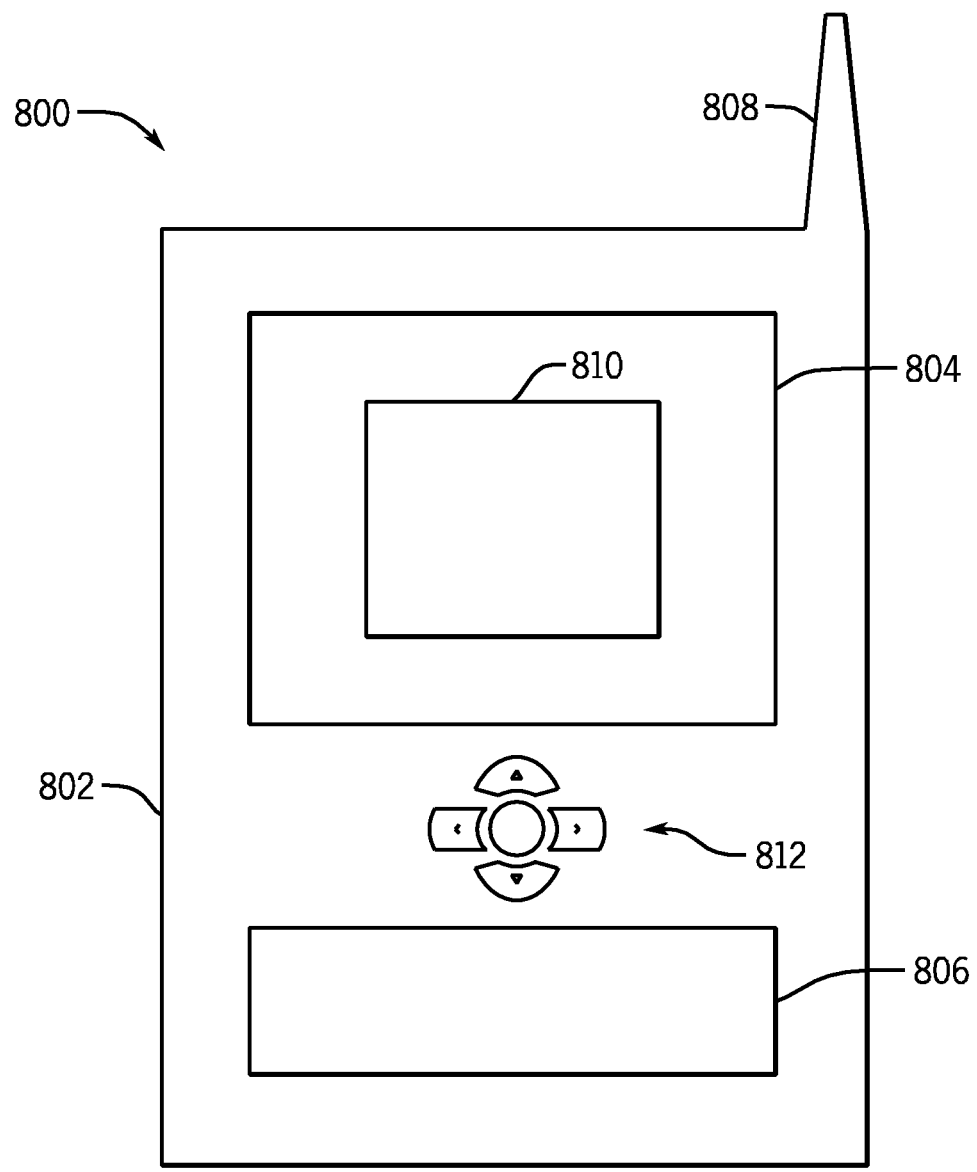
FIG. 4 is a front elevational view of one embodiment.

As described above, system 700 may be embodied in varying physical styles or form factors. FIG. 4 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

The processor 710 may communicate with a camera 722 and a global positioning system sensor 720, in some embodiments. A memory 712, coupled to the processor 710, may store computer readable instructions for implementing the sequences shown in FIG. 2 in software and/or firmware embodiments.

As shown in FIG. 4, device 800 may comprise a housing 802, a display 804, an input/output (I/O) device 806, and an antenna 808. Device 800 also may comprise navigation features 812. Display 804 may comprise any suitable display unit for displaying information appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

The following clauses and/or examples pertain to further embodiments:

One example embodiment may be a method comprising using said information to reduce processor power consumption, by selecting a lower of at least two power consumption states for a first frame and a higher of the at least two power consumption states for a second frame, wherein the processing time for the first frame being less than the processing time for the second frame. The method may include obtaining information about a capped frame time. The method may include selecting between at least two different power consumption reduction techniques every frame. The method may include reducing power consumption by reducing idle power consumption after rendering has finished on one frame and before rendering of the next frame starts. The method may include reducing power consumption by increasing frame processing time and reducing frame idle time. The method may include reducing power consumption by reducing frame processing time and increasing frame idle time. The method may include reducing power consumption during said increased frame idle time. The method may include reducing clock frequency. The method may include including reducing central processing unit power consumption. The method may include reducing graphics processing unit power consumption. The method may include obtaining information about a graphics frame processing time.

Another example embodiment may be a one or more non-transitory computer readable media to cause a processor to perform a sequence comprising using said information to reduce processor power consumption, by selecting a lower of at least two power consumption states for a first frame and a higher of the at least two power consumption states for a second frame, wherein the processing time for the first frame being less than the processing time for the second frame. The media may include the sequence including obtaining information about a capped frame time. The media may include the sequence including selecting between at least two different power consumption reduction techniques every frame. The media may include the sequence including reducing power consumption by reducing idle power consumption after rendering has finished on one frame and before rendering of the next frame starts. The media may include reducing power consumption by increasing frame processing time and reducing frame idle time. The media may include reducing power consumption by reducing frame processing time and increasing frame idle time. The media may include the sequence including reducing power consumption during said increased frame idle time. The media may include the sequence including reducing clock frequency. The media may include the sequence including reducing central processing unit power consumption. The media may include the sequence including reducing graphics processing unit power consumption. The media may include the sequence including obtaining information about a graphics frame processing time.

In another example embodiment may be an apparatus comprising a processor to use said information to reduce processor power consumption, by selecting a lower of at least two power consumption states for a first frame and a higher of the at least two power consumption states for a second frame, wherein the processing time for the first frame being less than the processing time for the second frame, and a memory coupled to said processor. The apparatus may include said processor to obtain information about a capped frame time. The apparatus may include said processor to select between at least two different power consumption reduction techniques every frame. The apparatus may include said processor to reduce power consumption by reducing idle power consumption after rendering has finished on one frame and before rendering of the next frame starts. The apparatus may include said processor to reduce power consumption by increasing frame processing time and reducing frame idle time. The apparatus may include said processor to reduce power consumption by reducing frame processing time and increasing frame idle time. The apparatus may include said processor to reduce power consumption during said increased frame idle time. The apparatus may include an operating system.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   increasing the idle time between completing processing of a first frame in a processor and beginning processing of a second frame as a result of decreasing the processing time of said first frame by increasing the power consumption state used for said first frame from a first to a second power consumption state, wherein said first power consumption state is not sufficient to allow idle power consumption to be reduced to a lower of two idle power consumption states and said second power consumption state increases idle time sufficiently to enable a transition to the lower of the two idle power consumption states;
   powering down to the lower of the two idle power consumption states during said idle time between processing said first and second frames; and
   reducing power consumption by reducing idle power consumption after rendering has finished on one frame and before rendering of the next frame starts.

2. The method of claim 1 including obtaining information about a capped frame time.

3. The method of claim 1 including selecting between at least two different power consumption reduction techniques every frame.

4. The method of claim 1 including reducing clock frequency.

5. The method of claim 1 including reducing central processing unit power consumption.

6. The method of claim 1 including reducing graphics processing unit power consumption.

7. The method of claim 1 including obtaining information about a graphics frame processing time.

8. One or more non-transitory computer readable media storing instructions to perform a sequence:
   increasing the idle time between completing processing of a first frame in a processor and beginning processing of a second frame as a result of decreasing the processing time of said first frame by increasing the power consumption state used for said first frame from a first to a second power consumption state, wherein said first power consumption state is not sufficient to allow idle power consumption to be reduced to a lower of two idle power consumption states and said second power consumption state increases idle time sufficiently to enable a transition to the lower of the two idle power consumption states;
   powering down to the lower of the two idle power consumption states during said idle time between processing said first and second frames; and
   reducing power consumption by reducing idle power consumption after rendering has finished on one frame and before rendering of the next frame starts.

9. The media of claim 8, the sequence including obtaining information about a capped frame time.

10. The media of claim 8, the sequence including selecting between at least two different power consumption reduction techniques every frame.

11. The media of claim 8, the sequence including reducing clock frequency.

12. The media of claim 8, the sequence including reducing central processing unit power consumption.

13. The media of claim 8, the sequence including reducing graphics processing unit power consumption.

14. The media of claim 8, the sequence including obtaining information about a graphics frame processing time.

15. An apparatus comprising:
   a processor to increase the idle time between completing processing of a first frame in a processor and beginning processing of a second frame as a result of decreasing the processing time of said first frame by increasing the power consumption state used for said first frame from a first to a second power consumption state, wherein said first power consumption state is not sufficient to allow idle power consumption to be reduced to a lower of two idle power consumption states and said second power consumption state increases idle time sufficiently to enable a transition to the lower of the two idle power consumption states, power down to the lower of the two idle power consumption states during said idle time between processing said first and second frames, said processor to reduce power consumption by reducing idle power consumption after rendering has finished on one frame and before rendering of the next frame starts; and
   a memory coupled to said processor.

16. The apparatus of claim 15, including said processor to obtain information about a capped frame time.

17. The apparatus of claim 15, including said processor to select between at least two different power consumption reduction techniques every frame.

18. The apparatus of claim 15, including an operating system.

* * * * *